United States Patent [19]
Tan et al.

[11] Patent Number: 5,785,817
[45] Date of Patent: Jul. 28, 1998

[54] MOLDABLE PULP MATERIAL AND METHOD OF MANUFACTURING MOLDED PULP PRODUCT

[75] Inventors: Masaru Tan, Tokyo; Tsutomu Noguchi; Mitoshi Kawano, both of Kanagawa; Kazutoshi Mahama, Gunma; Hiromu Ikeda; Sunao Suzuki, both of Saitama, all of Japan

[73] Assignees: Sony Corporation, Tokyo; Rengo Co., Ltd., Osaka, both of Japan

[21] Appl. No.: 675,407

[22] Filed: Jul. 2, 1996

[30] Foreign Application Priority Data

Jul. 3, 1995 [JP] Japan ................................ 7-167601
Jul. 3, 1995 [JP] Japan ................................ 7-167603

[51] Int. Cl.$^6$ .................................................. D21J 1/08
[52] U.S. Cl. .......................... 162/218; 162/224; 162/226; 521/55
[58] Field of Search ........................ 162/218, 220, 162/221, 223, 224, 226, 230; 521/54, 55; 264/86, 87

[56] References Cited

U.S. PATENT DOCUMENTS

| | | |
|---|---|---|
| 3,615,972 | 10/1971 | Morehouse, Jr. et al. ............. 156/79 |
| 4,929,308 | 5/1990 | Gerault et al. ......................... 162/145 |
| 5,242,637 | 9/1993 | Inoue et al. ............................. 264/45.3 |
| 5,360,825 | 11/1994 | Noguchi et al. . |
| 5,498,478 | 3/1996 | Hansen et al. .......................... 428/372 |
| 5,578,119 | 11/1996 | Short et al. ........................... 106/287.35 |

FOREIGN PATENT DOCUMENTS 0 598 372 A1  11/1993  European Pat. Off. .
WO 94/18384   1/1994   WIPO .

Primary Examiner—Peter Chin
Assistant Examiner—Steven B. Leavitt
Attorney, Agent, or Firm—Hill & Simpson

[57] ABSTRACT

A moldable pulp material, which contains a main constituent of pulp comprising strips of paper having a size of millimeters and a fibrous component defibrated from waste paper, a starch binder in which a portion of the hydroxyl group in molecules of starch is modified, and thermally expandable hollow particles, is mixed with water which is effective to gelatinize the starch binder. The moldable pulp material is filled in a mold assembly and compressed in the mold assembly. The compressed moldable pulp material is then heated to at least a gelatinization temperature at which the starch binder is gelatinized, for thereby gelatinizing the starch binder to produce a molded pulp product for use as a shock absorbing material.

26 Claims, 12 Drawing Sheets

▽ Dry Type (100 Parts of Pulp, 3 Parts of Thermally Expandable Hollow Particles, 10 Parts of Modified Starch)

◇ Dry Type (100 Parts of Pulp, 3 Parts of Thermally Expandable Hollow Particles, 10 Parts of Corn Starch)

□ Wet Type (100 Parts of Pulp, 5 Parts of Thermally Expandable Hollow Particles, 2 Parts of Rosin-Base Surface Treating Agent)

● Foamed Styrol (Expanded 40 Times in Size)

▽ Dry Type (100 Parts of Pulp, 3 Parts of Thermally Expandable Hollow Particles, 10 Parts of Modified Starch)

● Foamed Styrol (Expanded 40 Times in Size)

MOLDABLE PULP MATERIAL AND METHOD OF MANUFACTURING MOLDED PULP PRODUCT

BACKGROUND OF THE INVENTION

1. Field of the Invention

The present invention relates to a moldable pulp material and a method of manufacturing a molded pulp product, and more particularly to a moldable pulp material composed mainly of pulp and a method of manufacturing a molded pulp product of such a moldable pulp material.

2. Description of the Related Art

Heretofore, packages for electric appliances including television sets, video tape recorders, cassette tape recorders, etc., and other packages such as food trays, fish containers, etc. have primarily been made of foamed styrol otherwise known as polystyrene or styrofoam. Since foamed styrol or formed polystyrene is a good shock absorbing material, it is suitable especially for use as a package material for electric appliances.

However, packages molded of foamed styrol present various problems after use, particularly when they are thrown away after use. For example, when foamed styrol packages are burned in a furnace, they tend to damage the furnace due to the intensive heat they generate. When the foamed styrol is buried in soil, it remains unchanged chemically and physically because it is not degradable in soil.

Therefore, the widespread use of foamed styrol packages is causing serious concern about their disposal in view of the present growing interests in environmental protection and the conservation of natural resources.

There have been demands for moldable materials, as substitutes for foamed styrol, for use as package materials which are less conducive to environmental pollution and more effective to utilize natural resources. One of the substitute package materials is a moldable pulp material which is chiefly composed of waste paper such as waste newspaper.

One molded product formed of such a moldable pulp material is manufactured by applying a moldable pulp slurry produced from waste paper such as newspaper to a porous mold or a mold with a mesh screen, and then dehydrating, pressing, and drying the applied layer of moldable pulp slurry in several stages.

However, the molded product thus manufactured finds limited applications because it has a relatively small thickness ranging from 1 mm to 5 mm and is not strong enough to hold heavy objects. Inasmuch as the moldable pulp material has a relatively small shock absorbing capability of its own, it fails to meet shock absorbing requirements for packages for holding television sets, video tape recorders, cassette tape recorders, etc., which have weights of several Kg or greater.

At present, the moldable pulp material is mainly used as a package material for small packages including egg cases, small machine tool packages, seedling raising pots, packages for cassette tape recorders which have weights of 1 Kg or smaller, etc.

It has been proposed to increase the shock absorbing capability of molded products formed of a moldable pulp material by adding a small amount of binder and hollow particles, including microspheres to a main constituent of pulp (see Japanese laid-open patent publication No. 6-10300, for example).

Shock absorbing products which are molded of such a moldable pulp material have the same level of shock absorbing capability and moldability as products molded of foamed styrol. However, since the shock absorbing products are molded of a pulp slurry formed of waste paper pulp and containing only 10% of a solid material, it takes several hours to mold them through the process of filling the pulp slurry in a mold, dehydrating and drying the pulp slurry, and removing the molded product from the mold. Accordingly, the rate of production of shock absorbing products molded of a moldable pulp material has been low.

For the above reasons, there has been a demand for a moldable pulp material which has a high shock absorbing capability and can be molded into a molded product at a rate of production which is equivalent to the rate of production of molded products formed of foamed styrol.

SUMMARY OF THE INVENTION

It is therefore an object of the present invention to provide a method of manufacturing a molded pulp product which resolves the above-mentioned problems.

It is another object of the present invention to provide a moldable pulp material which resolves the above-mentioned problems.

According to the present invention, there is provided a method of manufacturing a molded pulp product, comprising the steps of mixing a moldable pulp material comprising a main constituent of pulp, a starch binder, and thermally expandable hollow particles with water which is effective to gelatinize the starch binder, filling the moldable pulp material mixed with the water in a mold assembly and compressing the moldable pulp material in the mold assembly, and heating the compressed moldable pulp material to at least a gelatinization temperature at which the starch binder is gelatinized, for thereby gelatinizing the starch binder to produce a molded pulp product of the moldable pulp material.

According to the present invention, there is also provided a moldable pulp material comprising a main constituent of pulp, a starch binder, and thermally expandable hollow particles.

According to the present invention, there is further provided a shock absorbing material manufactured by mixing a moldable pulp material comprising a main constituent of pulp, a starch binder, and thermally expandable hollow particles with water which is effective to gelatinize the starch binder, filling the moldable pulp material mixed with the water in a mold assembly and compressing the moldable pulp material in the mold assembly, and heating the compressed moldable pulp material for thereby gelatinizing the starch binder.

DETAILED DESCRIPTION OF THE PREFERRED EMBODIMENTS

A moldable pulp material and a method of forming a molded pulp product according to the present invention will be described in detail below with reference to the drawings. The method of forming a molded pulp product according to the present invention will be described below as a method of forming a shock absorbing material as a molded pulp product.

First, the moldable pulp material according to the present invention will be described below.

Waste newspaper is defibrated for 10 minutes by a defibrator (HFC-23 manufactured by Orient Co. Ltd.) and then passed through a filter having a mesh size of 2.5 mm, thereby producing a mass of defibrated pulp. The mass of defibrated pulp mainly comprises a mixture of small pieces of paper each having a size of about 2 by 2 mm and a fibrous component. The defibration of the waste newspaper is stopped before all the waste newspaper is defibrated into the fibrous component, more specifically, when the proportion of the fibrous component becomes greater than the proportion of the small pieces of paper. Since the mass of defibrated pulp comprises a mixture of small pieces of paper and a fibrous component, the mass of defibrated pulp can contain more water than if it were composed of only the fibrous component. To the mass of defibrated pulp, there were added 50 weight % of water, 3 weight % of foamed thermally expandable hollow particles (f-80D manufactured by Matsumoto Yushi Seiyaku Co., Ltd.), and 10 weight % of modified starch (EAT-4, the degree of acetylization: 3%–4%, the gelatinization temperature: 57° C.–63° C., manufactured by Honen Co., Ltd.). The mixture is kneaded for 5 minutes by a planetary mixer, producing a moldable pulp material. Because the waste newspaper contains about 9% of water in an air-dried state, the overall water content of the moldable pulp material is a little bit over about 36% by weight.

Figure 1:
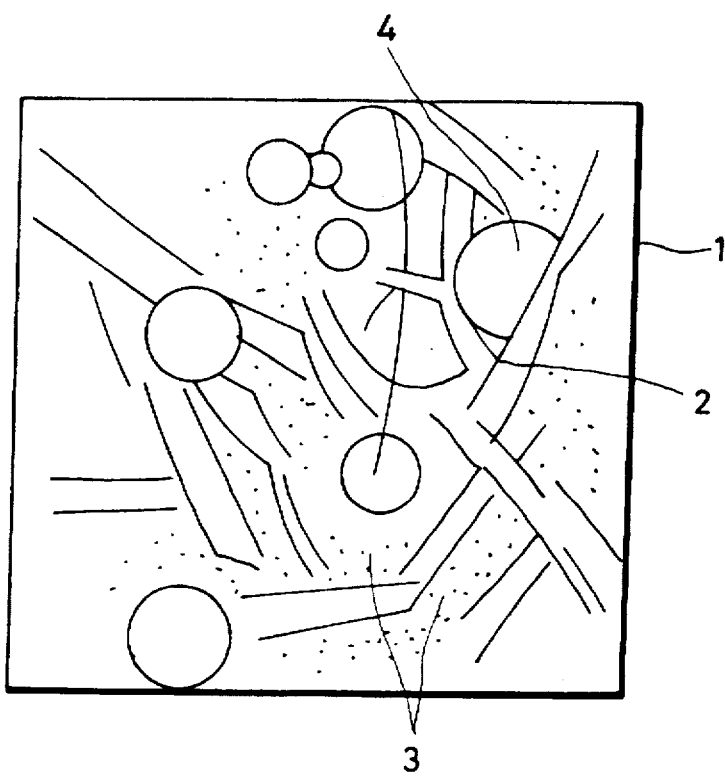
FIG. 1 is a diagram of an SEM photographic representation of a moldable pulp material according to the present invention.

FIG. 1 shows an SEM (scanning electron microscopy) photographic representation of a moldable pulp material 1 thus produced. As shown in FIG. 1, the moldable pulp material 1 comprises defibrated pulp 2, modified starch 3, and thermally expandable hollow particles 4.

The hollow particles serve as a cushioning agent in a shock absorbing material which is formed of a moldable pulp material by a molding apparatus (described later on). Specifically, when the shock absorbing material is pressed under external pressure, the hollow particles are deformed to perform a shock absorbing function. The hollow particles are produced as follows: Particles known as thermally expandable microcapsules each have an outer shell of polymer and an inner core of hydrocarbon which is covered with the outer shell. When the particles are heated, the outer shell of polymer is softened, and the inner shell of hydrocarbon is gasified. Therefore, the particles are expanded to increase their volumes several times to hundreds of several times to hundreds of times. The particles thus expanded are used as the hollow particles. The hollow particles should preferably have their outer shells highly elastic to absorb stresses applied thereto and be highly resistant to heat with their heat distortion temperature being of 130° C. or higher. Specifically, thermally expandable microcapsules having a distribution of particle diameters ranging from 10 μm to 30 μm, which comprise an organic solvent of isobutane, pentane, petroleum ether, hexane, or the like, which has a boiling point ranging from 50° C. to 100° C., encapsulated by a thermoplastic resin of vinylidene chloride, acrylonitrile, acrylic ester, methacrylic ester, or the like, are heated to 100° C. to 150° C. for a short period of time to increase their diameter 4 to 5 times and their volume 50 to 100 times, thus producing elastically deformable hollow particles having a true specific gravity ranging from 0.015 to 0.025, a distribution of particle diameters ranging from 40 μm to 200 μm, an average diameter of up to 100 μm, and a pressure resistance of 300 Kg/cm$^2$ or higher. The thermally expandable microcapsules may be expanded into the hollow particles before or after they are mixed with the defibrated pulp.

In embodiments and experimental examples described below, hollow particles that have already been expanded are mixed with the defibrated pulp. From the standpoint of the cost, however, it is preferable to expand the hollow particles after they, together with the modified starch and water, have been mixed with the defibrated pulp. For expanding the hollow particles after having been mixed with the defibrated pulp, such conditions should be maintained as to allow the hollow particles to be expanded sufficiently. The amount of hollow particles to be mixed with the defibrated pulp may be determined appropriately depending on the type of pulp that is used. For example, since the cost increases with the proportion of mixed hollow particles, the proportion of hollow particles to be mixed is determined in relation to the modified starch which serves as a binder. Specifically, if the proportion of hollow particles to be mixed is reduced and the amount of modified starch to be added is increased as much, then the bonding strength between the defibrated pulp and the hollow particles is increased, and the cost is lowered.

The modified starch which serves as a binder is produced by modifying a portion of the hydroxyl group in molecules of starch. Specifically, a portion of the hydroxyl group in molecules of starch may be replaced with an acetyl group or an ester group as indicated by the chemical formulas given below.

Starch (a portion of the hydroxyl group is replaced):

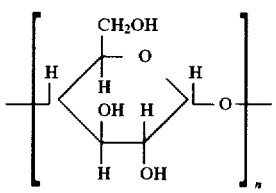

Acetylized odified starch (produced by replacing a portion of the hydroxyl group with an acetyl group X:—COCH$_3$):

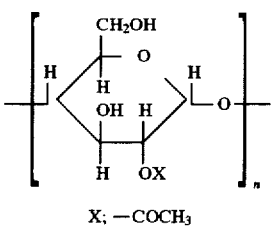

X; —COCH$_3$

Esterified modified starch (produced by replacing a portion of the hydroxyl group with an ester group X':—CO$_2$R'):

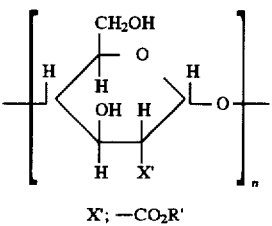

X'; —CO$_2$R'

The modified starch should preferably have a low gelatinization temperature ranging from about 55° C. to 65° C. If the added amount of modified starch were too large, then a shock absorbing material molded of the moldable pulp material would be unduly hard, and its shock absorbing capability would be unduly low. If the added amount of modified starch were too small, then the mechanical strength of a shock absorbing material molded of the moldable pulp material would be unduly low. Therefore, the upper limit of the range for the added amount of modified starch is determined depending on the shock absorbing capability and the cost which are desirable, and the lower limit of the range for the added amount of modified starch is determined depending on the desirable mechanical strength of the shock absorbing material.

The moldable pulp material according to the present invention may be produced from other waste paper than waste newspaper. For example, waste corrugated cardboard may be shredded into narrow strips or milled into fibers, and a mass of defibrated pulp may be produced from those narrow strips or fibers.

A mold assembly for molding a product of the moldable pulp material, a pressing apparatus for compressing the moldable pulp material filled in the mold assembly, and a heating apparatus according to a first embodiment of the present invention will be described below with reference to FIGS. 2 through 6.

Figure 4:
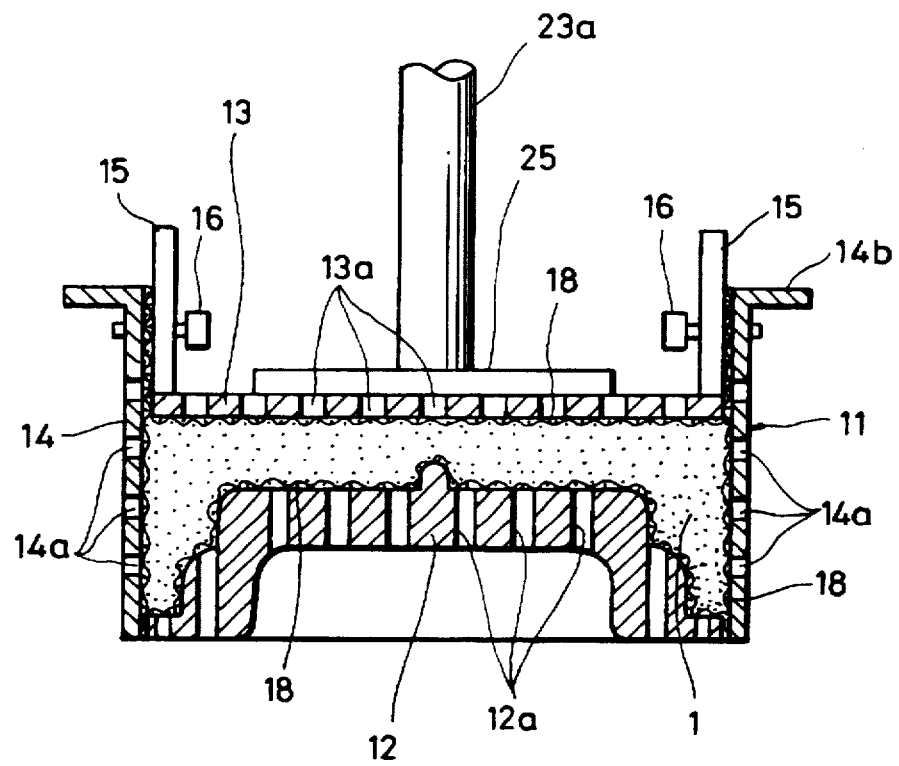
FIG. 4 is a cross-sectional view of a central portion of the pressing apparatus shown in FIG. 3.
Figure 2:
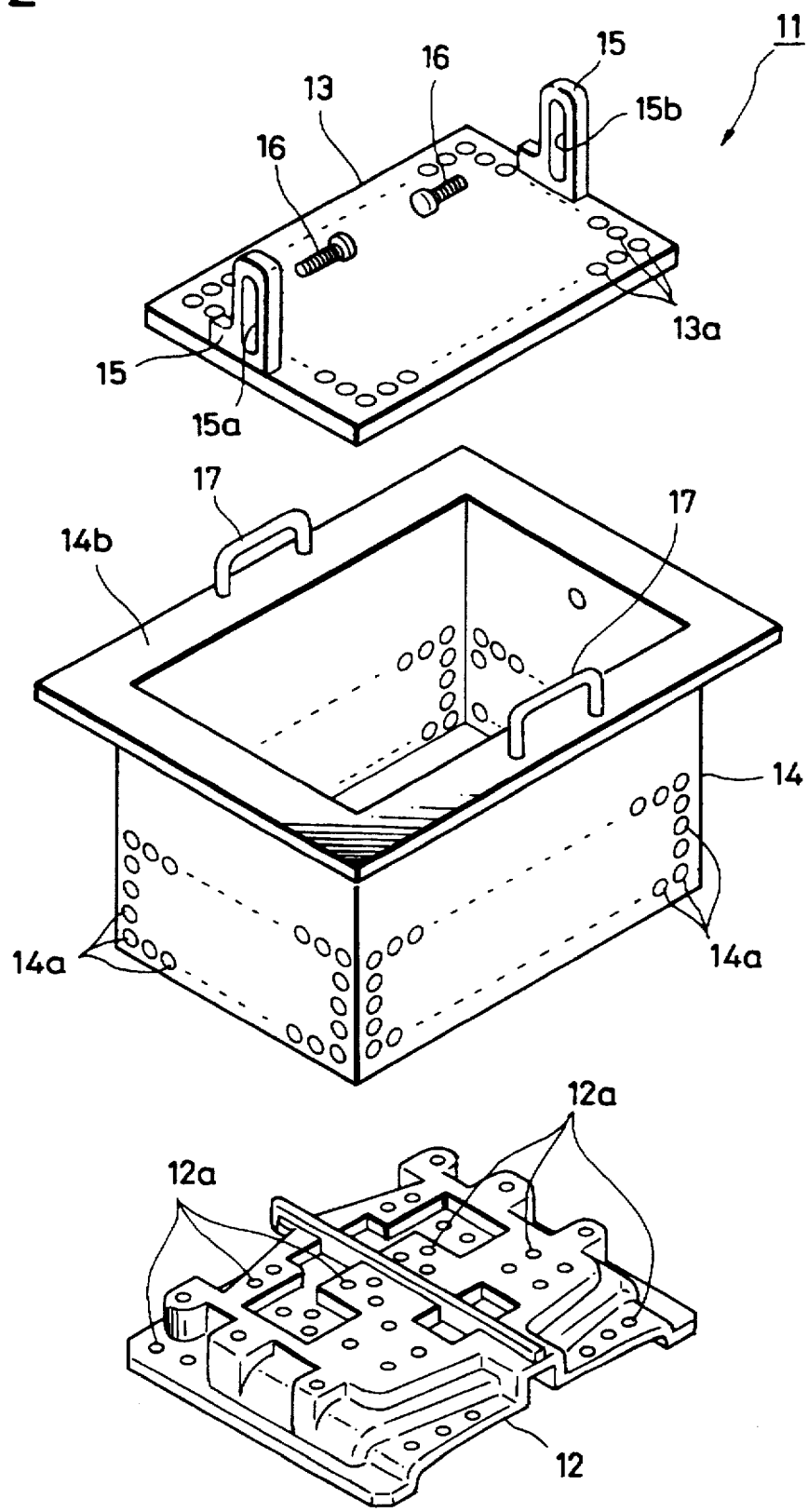
FIG. 2 is an exploded perspective view of a mold assembly for molding a product of the moldable pulp material according to the present invention.
Figure 3:
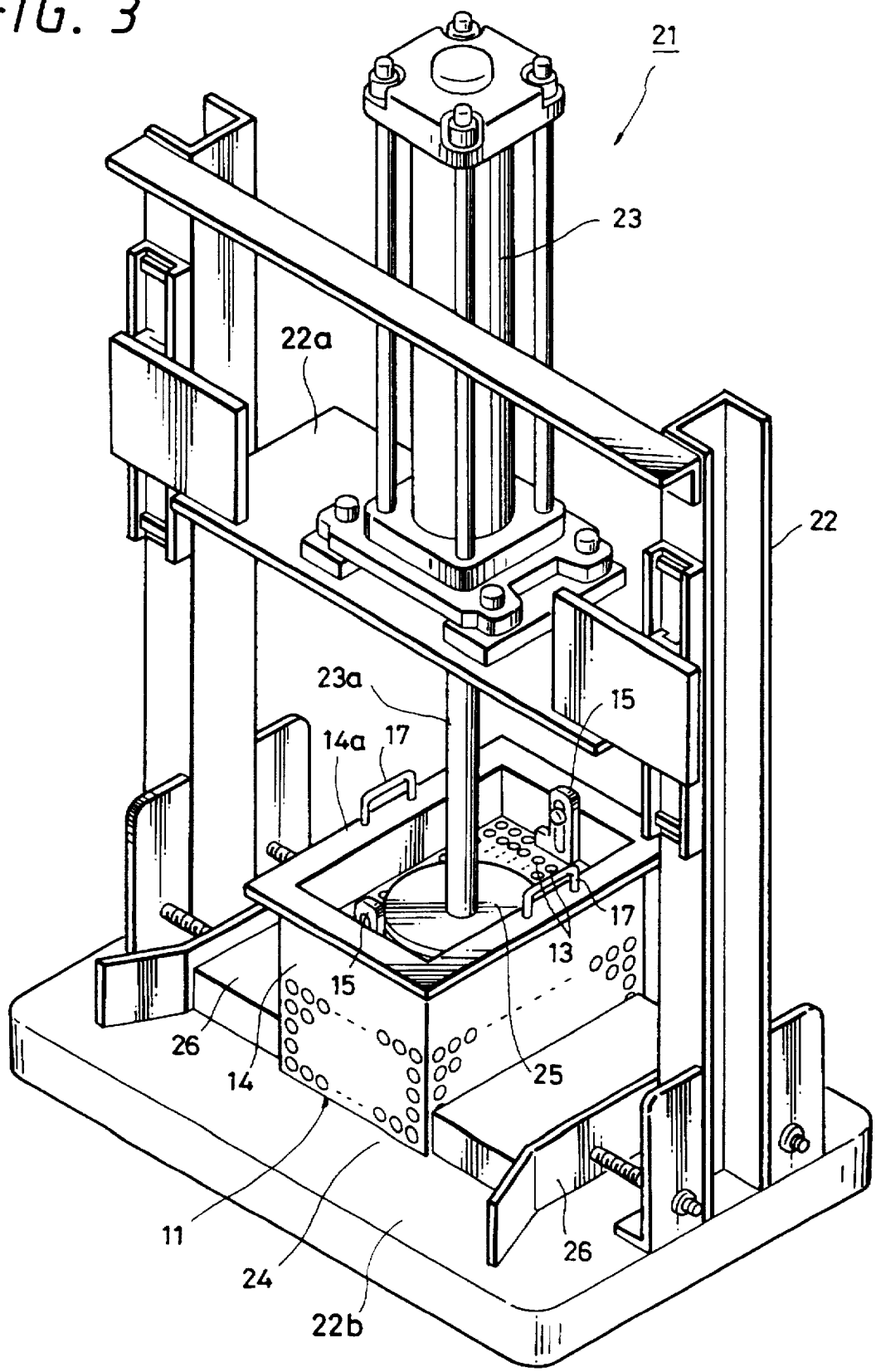
FIG. 3 is a perspective view of a pressing apparatus for compressing the moldable pulp material filled in the mold assembly shown in FIG. 2.

As shown in FIGS. 2 through 4, a mold assembly 11 comprises a lower mold 12 made of an aluminum alloy and having an upper surface as a main molding surface which has a predetermined three-dimensional shape, an upper mold 13 made of an aluminum alloy and comprising a plate having a flat pressing surface, and a boxed-shaped frame 14 having upper and lower openings. The lower and upper molds 12, 13 are fitted in the frame 14. The lower and upper molds 12, 13 and the frame 14 have a number of vent holes 12a, 13a, 14a defined respectively therein at a spacing or pitch of about 15 mm, each of the vent holes 12a, 13a, 14a having a diameter of 10 mm. The upper mold 13 has a pair of vertical attachment guide bars 15 mounted on an upper surface thereof at respective opposite ends thereof. The attachment guide bars 15 have respective vertical guide slots 15a defined therein. The upper mold 13 is fastened to the frame 14 by screws 16 with handles, which are inserted through the respective vertical guide slots 15a and threaded into respective end walls of the frame 14. The frame 14 has a flange 14b extending along an upper edge thereof, and a pair of grips 17 mounted on the flange 14b above respective side walls of the frame 14.

As shown in FIG. 3, a pressing apparatus 21 has an air cylinder 23 mounted on an upper support base 22a of a machine frame 22, and a mold assembly holder 24 mounted on a lower support base 22b of the machine frame 22. The air cylinder 23 has a cylinder rod 23a extending downwardly and supporting on its lower end a presser disk 25 which can be inserted downwardly into the frame 14 when the cylinder rod 23a is lowered. The mold assembly holder 24 includes a pair of confronting mold assembly clamps 26 for clamping the mold assembly 11 therebetween.

Figure 5:
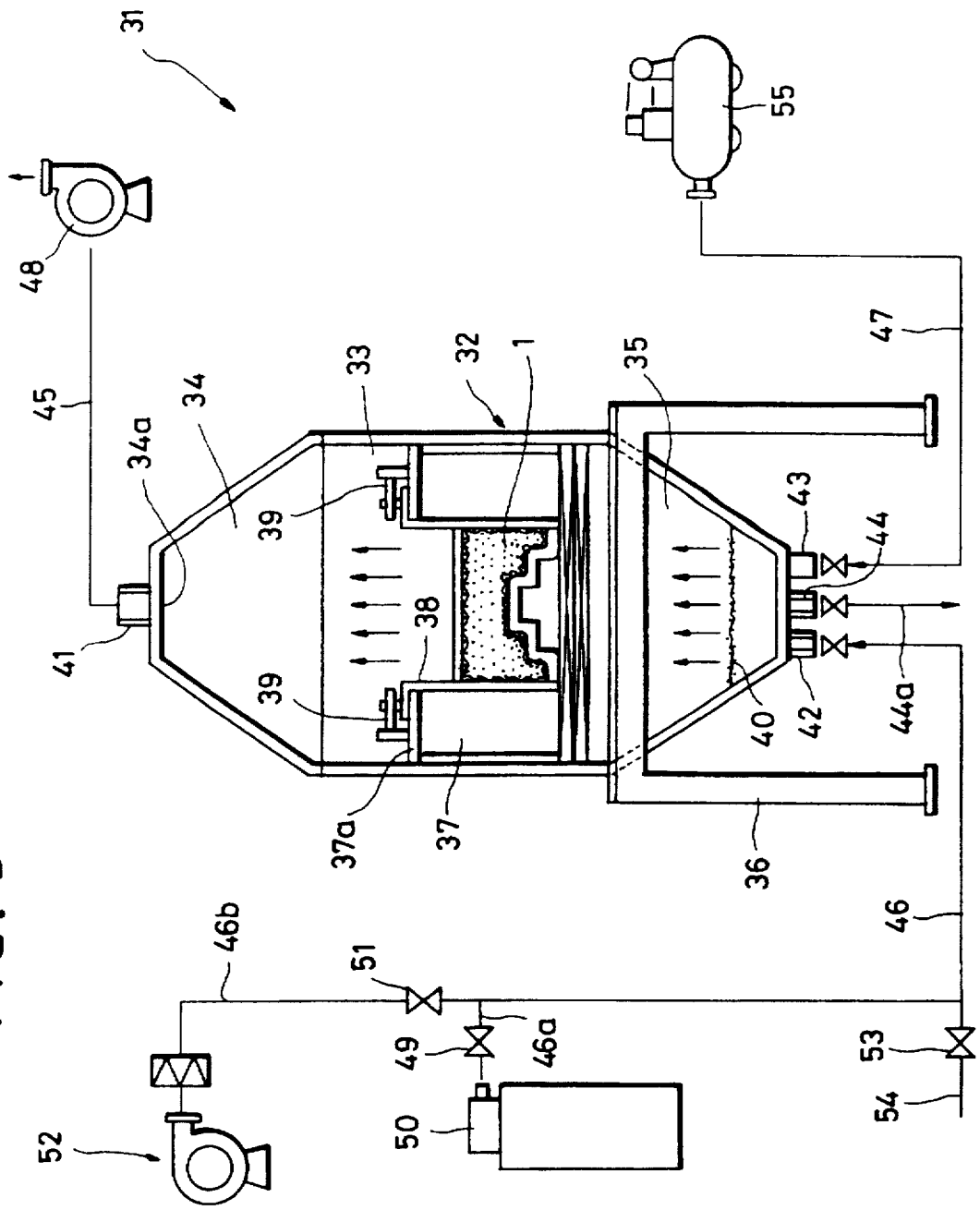
FIG. 5 is a diagram of a heating apparatus according to a first embodiment of the present invention.
Figure 6:
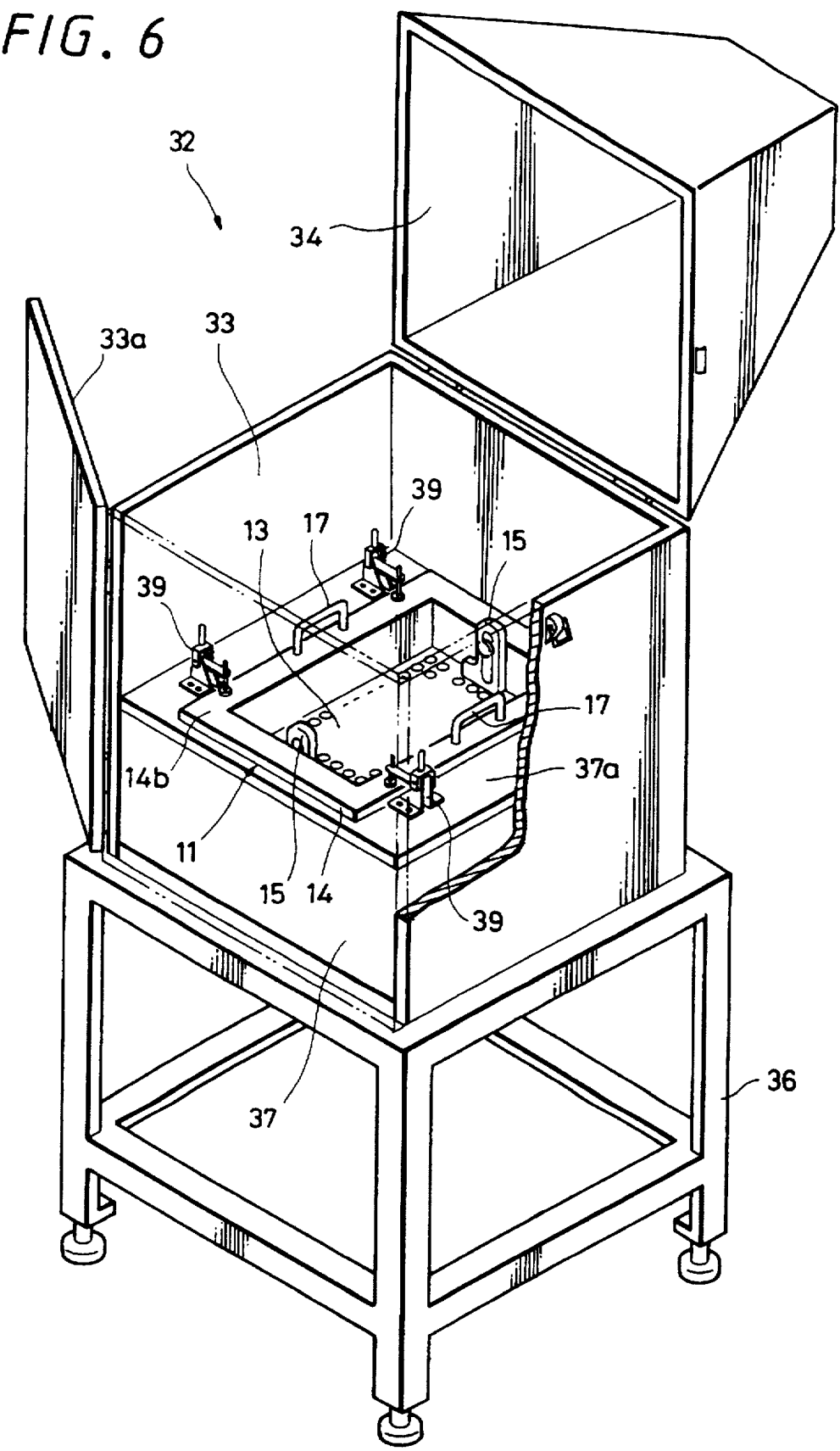
FIG. 6 is a perspective view of a main housing of the heating apparatus shown in FIG. 5.

As shown in FIGS. 5 and 6, a heating apparatus 31 according to the first embodiment comprises a main housing 32 having a mold assembly storage chamber 33 defined therein, an upper discharge chamber 34 defined above the main housing 32, and a lower pressure regulating chamber 35 (see FIG. 5) defined below the main housing 32. The main housing 32 is supported on a machine frame 36. As shown in FIG. 6, the main housing 32 has a hinged front wall 33a which can be opened and closed to open and close the mold assembly storage chamber 33. The discharge chamber 34 has a frustopyramidal shape or the shape of a frustum of a pyramid, and is hinged so as to be opened about a rear edge thereof with respect to the mold assembly storage chamber 33.

The mold assembly storage chamber 33 includes a lower space 37 defined below a mold assembly attachment plate 37a for receiving the mold assembly 11 therein, the lower space 37 communicating with the lower pressure regulating chamber 35. The mold assembly attachment plate 37a has a central opening 38 defined therein for receiving therein the frame 14 of the mold assembly 11 when the mold assembly 11 is placed in the lower space 37. When the mold assembly 11 is placed in the lower space 37 with the frame 14 received in the opening 38, the flange 14b is fastened to the mold assembly attachment plate 37a by a plurality of toggle clamps 39 which are mounted on the mold assembly attachment plate 37a around the opening 38.

As shown in FIG. 5, the lower pressure regulating chamber 35 has an inverted frustopyramidal shape, and houses a water droplet stop net 40 kept taut horizontally.

The main housing 32 of the heating apparatus 31 is associated with a piping system as described below.

The discharge chamber 34 has an upper wall 34a fitted with an outlet port 41. The pressure regulating chamber 35 has a lower wall 35a fitted with first and second inlet ports 42, 43 combined with respective valves and a water outlet port 44 combined with a valve. The piping system includes a discharging pipe 45 connected to the outlet port 41, a first pipe 46 connected to the first inlet port 42 for supplying steam under pressure or hot air, a second pipe 47 connected to the second inlet port 43 for supplying air under pressure at normal temperature, and a drain pipe 44a connected to the water outlet port 44.

The discharging pipe 45 is connected to a discharge blower 48. The first pipe 46 is branched into a branch pipe 46a connected through a shutoff valve 49 to a boiler 50 which generates steam under pressure, and a branch pipe 46b connected through a shutoff valve 51 to a hot air blower 52. In the first embodiment described below, the shutoff valve 51 remains closed, and hot air produced by the hot air blower 52 is not supplied to the first pipe 46. To the first pipe 46 downstream of the branch pipes 46a, 46b, there is connected a drain pipe 54 through a drain valve 53. The second pipe 47 is coupled to a compressor 55. The drain pipe 44a is connected to a drain.

A process of molding a shock absorbing material of the moldable pulp material using the mold assembly 11, the pressing apparatus 21, and the heating apparatus 31 will be described below.

First, the lower mold 12 is fitted into the lower open end of the frame 14, and an air- and water-permeable sheet 18 such as of nonwoven cloth is laid on the upper surface of the lower mold 12 and inner wall surfaces of the frame 14. Then, a predetermined amount of the moldable pulp material 1 is charged into the frame 14 and forcibly filled so as to fully cover the three-dimensional upper surface of the lower mold 12.

After the moldable pulp material 1 is charged, the sheet 18 is also placed over the upper surface of the moldable pulp material 1, and then the upper mold 13 is inserted into the frame 14 through its upper open end and placed on the moldable pulp material 1 with the sheet 18 interposed therebetween, as shown in FIG. 4. Thereafter, the screws 16 are inserted through the guide slots 15a in the attachment guide bars 15 and threaded into the end walls of the frame 14. At this time, the screws 16 are not fully tightened so that the upper mold 13 can slide vertically with respect to the frame 14.

As described above, the air- and water-permeable sheet 18 such as of nonwoven cloth is laid on the upper surface of the lower mold 12, the inner wall surfaces of the frame 14, and the lower surface of the upper mold 13. However, the air- and water-permeable sheet 18 may be dispensed with if the vent holes 12a, 13a, 14a defined in the lower and upper molds 12, 13 and the frame 14 are sufficiently small in diameter or a lubricating layer is disposed on the upper surface of the lower mold 12, the inner wall surfaces of the frame 14, and the lower surface of the upper mold 13. The vent holes 12a, 13a, 14a serve to allow air to escape from the moldable pulp material 1 when the moldable pulp material 1 is pressurized by the air cylinder 23, as described later on.

The mold assembly 11 which has thus been filled with the moldable pulp material 1 is then placed in the mold assembly holder 24 of the pressing apparatus 21, and set in position in the pressing apparatus 21 by the mold assembly clamps 26 which sandwich the mold assembly 11 in engagement with lower opposite sides of the mold assembly 11.

Thereafter, the air cylinder 23 is actuated to lower the cylinder rod 23a, pressing the presser disk 25 downwardly into the frame 14 against the upper surface of the upper mold 13. The air cylinder 23 is continuously operated to cause the presser disk 25 to press the upper mold 13 for thereby compressing the moldable pulp material 1 in the mold assembly 11 under a predetermined pressure. The moldable pulp material 1 is now adjusted in density such that its density will be about 0.125 g/cm$^3$ (=125 Kg/m$^3$) after it is dried, and has its lower portion shaped complementarily to the three-dimensional shape of the upper surface of the lower mold 12.

Then, the screws 16 are fully tightened to fasten the upper mold 13 to the frame 14 through the attachment guide bars 15.

Thereafter, the cylinder rod 23a is lifted back, and the mold assembly 11 is removed from the mold assembly holder 24 and transferred into the heating apparatus 31. The molded mass of the moldable pulp material 1 in the mold assembly 11 is dried with heat into a shock absorbing material by the heating apparatus 31.

Operation of the heating apparatus 31 will be described below. The mold assembly 11 taken out of the pressing apparatus 21 is placed in the mold assembly storage chamber 33 of the heating apparatus 31. Specifically, the front wall 33a is opened, and the upper discharge chamber 34 is lifted open, exposing the mold assembly attachment plate 37a. The mold assembly 11 is fitted in the central opening 38 defined in the mold assembly attachment plate 37a, with the flange 14b placed on the mold assembly attachment plate 37a. The flange 14b is then fastened to the mold assembly attachment plate 37a by the toggle clamps 39. After the mold assembly 11 is fixedly positioned in the heating apparatus 31, the front wall 33a and the upper discharge chamber 34 are closed, sealing the mold assembly storage chamber 33.

Now, the shutoff valve 51 is closed and the shut-off valve 49 is opened, and the boiler 50 is operated to generate steam under pressure. The generated steam under pressure, which is set to a temperature ranging from 100° C. to 110° C., as converted to heat, under a 1~1.5 atmospheric pressure, is delivered through the first pipe 46, and introduced from the first inlet port 42, opened by its valve, into the pressure regulating chamber 35. In the pressure regulating chamber 35, condensed water droplets are removed from the pressurized steam by the water droplet stop net 40, and the pressurized steam is uniformized in pressure. Then, the pressurized steam is supplied to the lower space 37 in the mold assembly storage chamber 33. If the pressure of the steam were too high, the hollow particles in the moldable pulp material 1 would be distorted or cracked. If the pressure of the steam were too low, the modified starch would not sufficiently be gelatinized.

Water droplets condensed in the pressure regulating chamber 35 are drained from the water outlet port 44 through the drain pipe 44a. Water droplets condensed in the first pipe 46 are drained from the drain valve 53 through the drain pipe 54 when the drain valve 53 is opened.

After the condensation is removed from the pressure regulating chamber 35 and the first pipe 46, the valve of the water outlet port 44 and the drain valve 53 are closed. The steam is supplied from the lower space 37 to the molded mass of the moldable pulp material 1 in the mold assembly 11. The supplied steam flows into the mold assembly 11 through the vent holes 12a, 14a of the lower mold 12 and the frame 14, passes through and heats the molded mass of the moldable pulp material 1 in the mold assembly 11, and flows from the vent holes 13a of the upper mold 13 into the upper discharge chamber 34 above the mold assembly storage chamber 33. When the steam passes through the molded mass of the moldable pulp material 1, it supplies heat and water to the molded mass. As a result, the modified starch in the molded mass is gelatinized. Thereafter, the steam is forcibly drawn and discharged from the upper discharge chamber 34 through the outlet port 41 and the discharging pipe 45 by the discharge blower 48.

The steam supplied to and passing through the molded mass of the moldable pulp material 1 is forcibly drawn and discharged under a negative pressure, e.g., a 0.5 atmospheric pressure, by the discharge blower 48, while heating the molded mass.

The steam is supplied and forcibly discharged continuously for a given period of time, e.g., of several tens seconds. Then, while the discharge blower 48 is in operation, the first inlet port 42 is closed by its valve, and the second inlet port 43 is opened by its valve. A gas having a temperature lower than the temperature at which the modified starch is gelatinized, e.g., dry air at normal temperature under a predetermined pressure, e.g., a 1.4 atmospheric pressure, is supplied from the compressor 55 through the second pipe 47 to the pressure regulating chamber 35 continuously for several tens seconds.

After the dry air is supplied and forcibly discharged, the mold assembly storage chamber 33 is opened as described above and the mold assembly 11 is removed from the heating apparatus 31. Immediately thereafter, the molded mass of the moldable pulp material 1 is removed from the mold assembly 11.

As described above, the molded mass of the moldable pulp material 1 is heated with the steam while in the main housing 32 of the heating apparatus 31, during which time the modified starch added as a binder to the moldable pulp material 1 is gelatinized. After the molded mass is heated with the steam and while it is being held in the mold assembly 11 removed from the heating apparatus 31 prior to removal from the mold assembly 11, the gelatinization of the modified starch progresses due to the heat applied from the steam, and water is evaporated from the gelatinized modified starch. The bonding strength of the gelatinized modified starch now becomes strong enough to allow the molded mass to be removed in one piece from the mold assembly 11.

The molded mass of the moldable pulp material 1 may be heated to shape by hot air supplied from the hot air blower 52. Details of such a process will be described below with reference to a second embodiment of the present invention.

In the above process of heating the molded mass to shape with the steam according to the first embodiment of the present invention, since the steam supplies heat and water to the moldable pulp material 1 while passing through the moldable pulp material 1, the original water content of the moldable pulp material 1 may range from 20 to 60 weight %. The lower limit of the range for the original water content, i.e., 20 weight %, represents an amount required to knead the mixture of the small pieces of paper and the fibrous component easily with the hollow particles and the modified starch. The lower limit is not large enough to gelatinize the modified starch, but enough water is supplied from the steam to gelatinize the modified starch. The upper limit of the range for the original water content, i.e., 60 weight %, is determined by the period of time for which the molded mass is dried and the ease with which the molded mass is separated from the mold assembly 11.

Specific experimental examples in which a moldable pulp material was molded into a shock absorbing material by the above steam-heating process according to the first embodiment will be described below.

EXPERIMENTAL EXAMPLE 1

A moldable pulp material which was prepared from the above constituents at the above proportions was filled in the mold assembly, and pressed to a density of 0.125 g/cm$^3$ (=125 Kg/m$^3$) after it is dried. The mold assembly was installed in the heating apparatus, and heated for 1 minute and 30 seconds with steam at 100° C. to 110° C. under a 1~1.4 atmospheric pressure, supplied from below the mold assembly. The mold assembly was removed from the heating apparatus, and left to stand at normal temperature for about 1 minute, after which the molded mass was removed from the mold assembly. It was confirmed that due to the gelatinization of the modified starch added as a binder, the molded mass developed enough bonding forces to remove itself from the mold assembly, during the total time of 2 minutes and 30 seconds. The molded mass removed from the mold assembly was then heated at 60° C. for 4 hours by an air blower drier, so that it was dried enough to be practically usable as a shock absorbing material.

The period of time for which the molded mass is to be heated with the steam depends on the thickness of the molded mass and the structure of the mold assembly, and the modified starch starts being gelatinized when supplied with water and heated to a temperature higher than the gelatinization temperature thereof. It is necessary to heat the molded mass with the steam for at least about 20 seconds after the entire molded mass is filled with the steam. In this experimental example, when the molded mass was heated with the steam for 1 minute and 20 seconds or shorter, the entire molded mass was not sufficiently gelatinized, and the mechanical strength of the dried product was insufficient. When the molded mass was heated with the steam for periods of time ranging from 2 minutes to 10 minutes, the mechanical strength of the dried product remained unchanged.

EXPERIMENTAL EXAMPLE 2

The mold assembly filled with the above moldable pulp material which was adjusted in density was installed in the heating apparatus, and heated with steam at 100° C. to 110° C. under a 1~1.4 atmospheric pressure, supplied from below the mold assembly and forcibly discharged under a negative pressure of about a 0.5 atmospheric pressure from above the mold assembly. The steam passed through the molded mass of the moldable pulp material in about 20 seconds after the steam started to be supplied to the heating apparatus, and was discharged from the discharge blower connected to the outlet port of the heating apparatus. Thereafter, the steam was supplied and forcibly discharged for 20 seconds. Then, while the discharge blower was in operation, dry cold air was supplied under about a 1.4 atmospheric pressure to the molded mass for 30 seconds. Immediately after the mold assembly was taken from the heating apparatus, the molded mass could be removed from the mold assembly. The bonding strength of the modified starch contained in the molded mass removed from the mold assembly proved large enough to allow the mass removed in one piece from the mold assembly as with the experimental example 1. Since the amount of water contained in the heated molded mass was smaller than with the experimental example 1, it was found that the period of time for which the molded mass was heated with the steam was reduced to about half (from 1 minute and 30 seconds to 40 seconds) by forcibly drawing and discharging the steam. After the molded mass was heated with the steam, the dry cold air which was supplied and forcibly discharged promoted evaporation of water from the molded mass, resulting in a reduction of the time (from 1 minute to 30 seconds) required before removing the molded mass from the mold assembly. Inasmuch as the dry cold air which was supplied to the molded mass was effective to cool the molded mass, the molded mass removed from the mold assembly was easily handled. It was confirmed that, in both the experimental examples 1 and 2 it was possible to form a shock absorbing pulp molding or product in a molding cycle time ranging from about 1 minute and 10 seconds to 2 minutes and 30 seconds, which was less than the molding cycle time of about 3 minutes for molding foamed styrol.

Evaluation of shock absorbing capability

Figure 7:
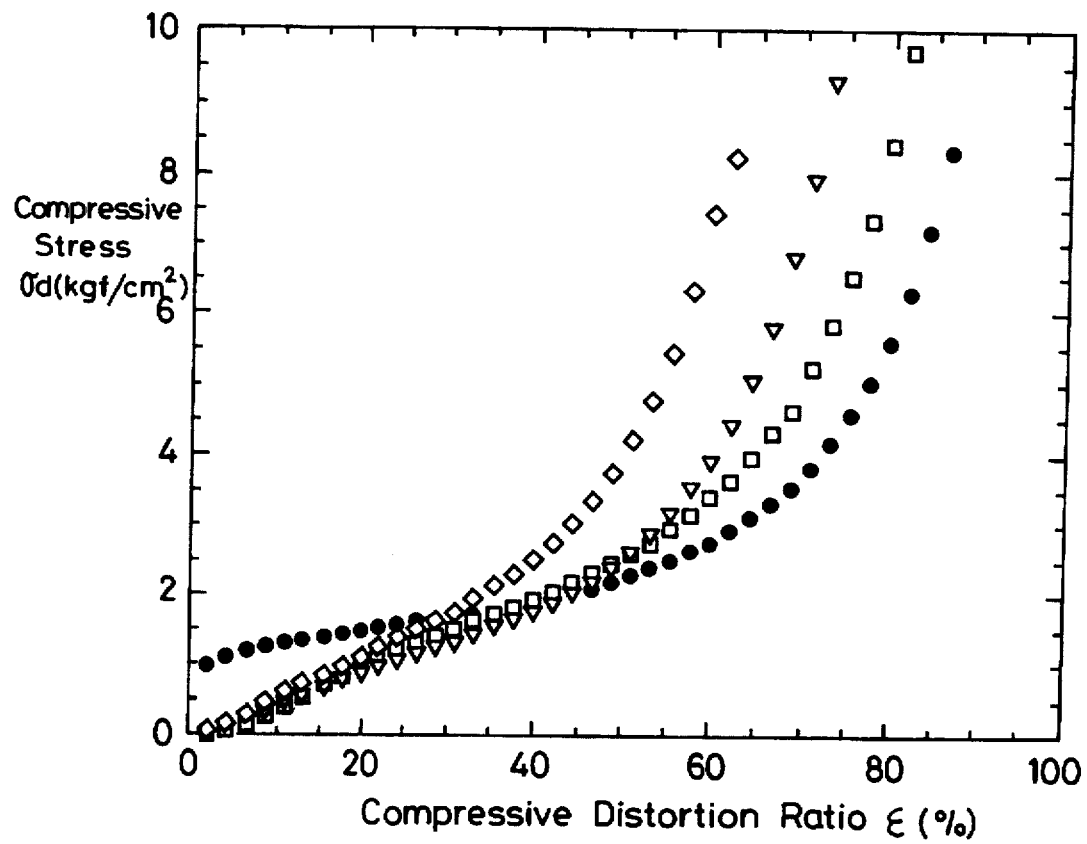
FIG. 7 is a graph showing the relationship between the compressive distortion ratio and the compressive stress plotted based on the results of a dynamic pressure test conducted on molded masses of moldable pulp materials.

The molded mass produced in the experimental example 1 was tested in a dynamic compression test, and a stress vs. distortion diagram was plotted based on the results of the dynamic compression test for the evaluation of a shock absorbing capability. The compressive stress at a compressive distortion of 50 % of the molded mass produced in the experimental example 1 had a value equivalent to the value of foamed styrol expanded 40 times in size. A sample (wet type) produced in a comparative example, given below, also had an equivalent compressive stress. It was confirmed that it was possible to form a molded mass having the same shock absorbing capability, i.e., the shock absorbing coefficient: Cf=compressive stress/distorting energy, as that of foamed styrol. FIG. 7 shows the relationship between the compressive distortion ratio and the compressive stress based on the results of a dynamic compression test conducted on the experimental example 1 (dry type including 3 % of thermally expandable hollow particles), a comparative example (wet type including 5 % of thermally expandable hollow particles), a sample (dry type including 3 % of thermally expandable hollow particles) with a binder of 10 % of corn starch, and foamed styrol expanded 40 times in size.

Figure 8:
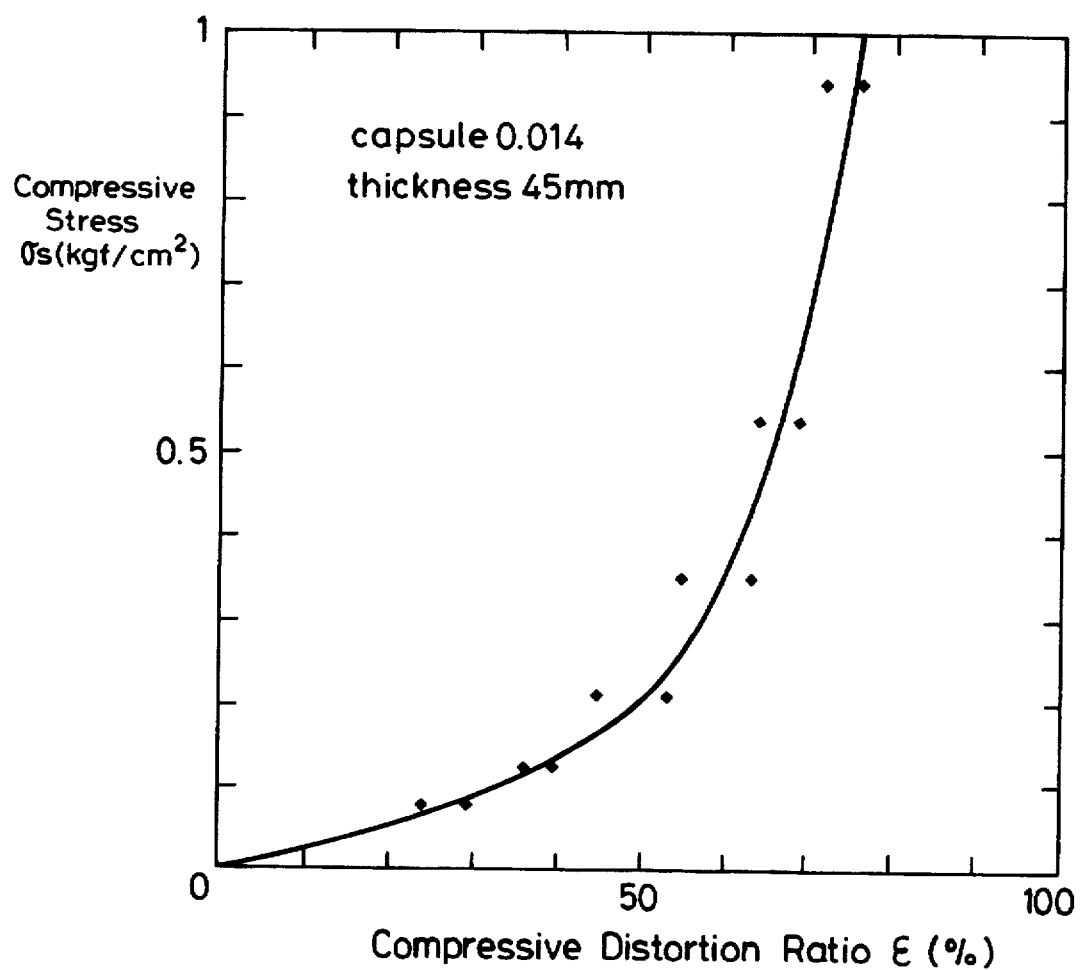
FIG. 8 is a graph showing the relationship between the compressive distortion ratio and the compressive stress plotted based on the results of a static pressure test conducted on a molded masse of a moldable pulp material.
Figure 9:
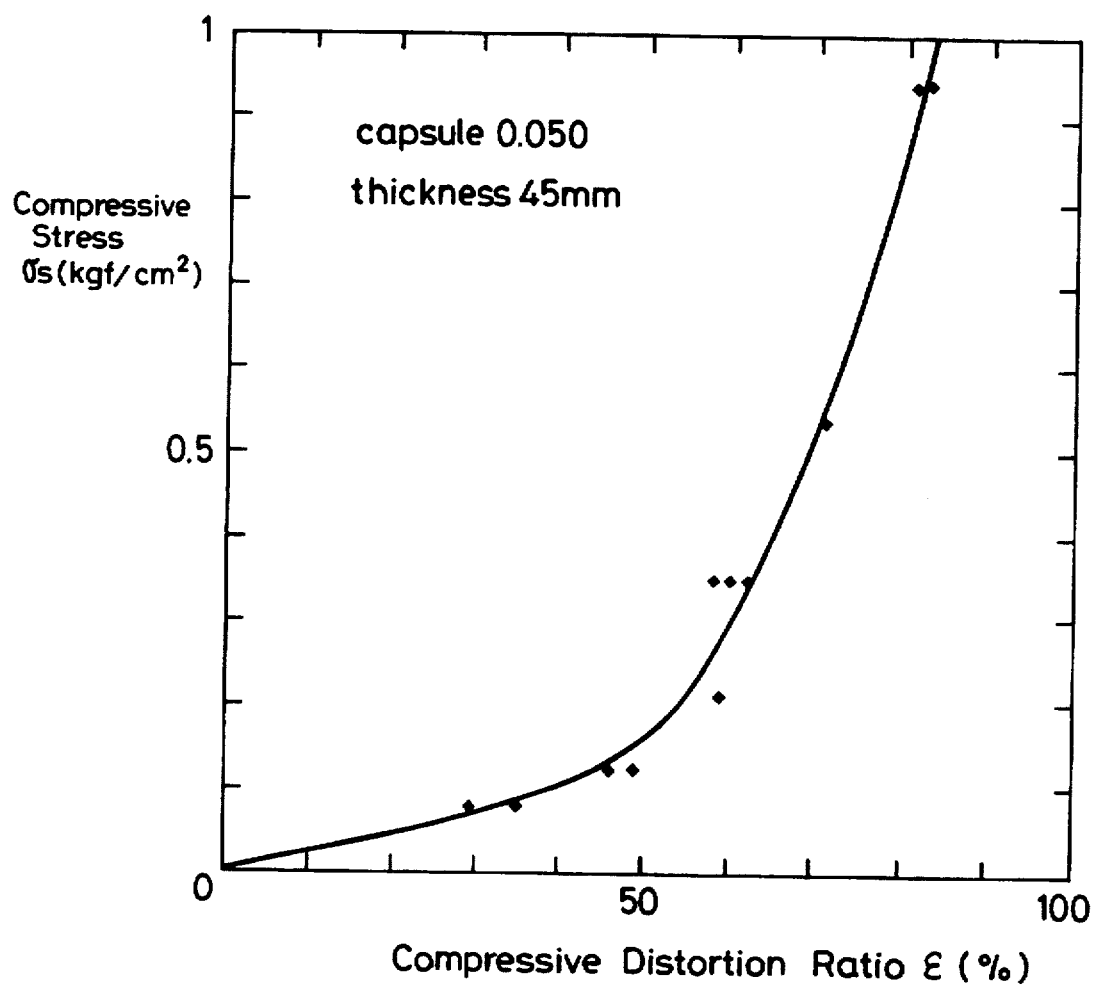
FIG. 9 is a graph showing the relationship between the compressive distortion ratio and the compressive stress plotted based on the results of a static pressure test conducted on a molded mass of a moldable pulp material.
Figure 10:
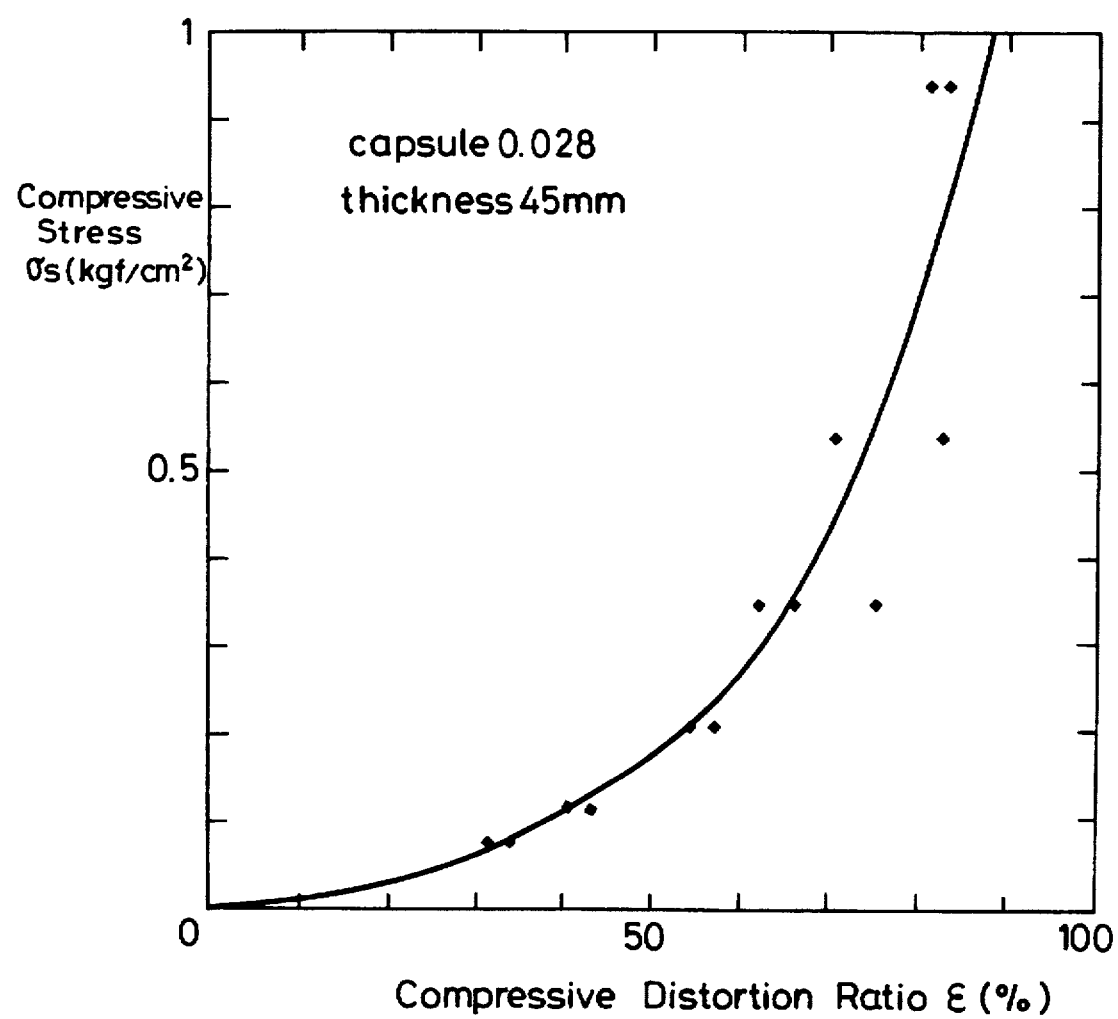
FIG. 10 is a graph showing the relationship between the compressive distortion ratio and the compressive stress plotted based on the results of a static pressure test conducted on a molded mass of a moldable pulp material.

Effect of the added amount of thermally expandable hollow particles 1.4 weight %, 2.8 weight %, 5 weight %, and 10 weight % of thermally expandable hollow particles were added to the mass of defibrated pulp in the moldable pulp material prepared according to the experimental example 1, and resultant molded masses were tested in static compression tests, and stress vs. distortion diagrams were plotted based on the results of the static compression tests for the comparison of their shock absorbing capabilities. FIGS. 8 through 10 show the stress vs. distortion diagrams with respect to the molded masses of moldable pulp materials which contained 1.4 weight %, 2.8 weight %, and 5 weight % of thermally expandable hollow particles, respectively. The addition of 5 weight % of thermally expandable hollow particles showed the same characteristics as those achieved by the addition of 2.8 weight % of thermally expandable hollow particles, and hence exhibited no effect produced on its own. The addition of 10 weight % of thermally expandable hollow particles resulted in an appreciable reduction in the mechanical strength of the molded mass, making it difficult to remove the molded mass in one piece from the mold assembly. Therefore, the thermally expandable hollow particles should be added in an amount ranging from 1 to 5 weight %.

Effect of the type of starch 10 weight % of different types of starch were added the mass of defibrated pulp in the moldable pulp material prepared according to the experimental example 1, and resultant molded masses were evaluated for their shock absorbing capability. When heated with heat at 100° C. for 3 minutes, corn starch and tapioca were not sufficiently gelatinized and did not produce sufficient bonding strength, and the molded masses containing corn starch and tapioca had poor mechanical strength and surface finish. When heated with heat at 100° C. for 3 minutes, modified starch was sufficiently gelatinized, and the molded mass containing modified starch had good mechanical strength and surface finish. The shock absorbing capability (shock absorbing coefficient Cf) of the molded mass containing modified starch was 15 to 20% better than the shock absorbing capabilities of the molded masses containing corn starch and tapioca. FIG. 7 also shows the relationship between the compressive distortion ratio and the compressive stress based on the results of a dynamic compression test conducted on the molded masses which contained corn starch and acetylized modified starch. The modified starch, which is produced by replacing a portion of the hydroxyl group in molecules of starch, with an acetyl group or an ester group, has a gelatinization temperature ranging from about 55° C. to 65° C., which is 15° C. to 25° C. lower than the gelatinization temperature of corn starch, and can be gelatinized in a shorter period of time. It was therefore confirmed that the modified starch is more suitable for use as a binder in a shock absorbing pulp molding as a substitute for foamed styrol.

Comparative example (pulp molding of a slurry pulp material)

Beaten pulp used in a papermaking process was dried. To the dried pulp, there were added 5 weight % of thermally expandable hollow particles (f-80D manufactured by Matsumoto Yushi Seiyaku Co., Ltd.) and 2 weight % of a rosin-base surface treating agent. The mixture was kneaded by a planetary mixer, producing a pulp slurry containing 10% of a solid component and 90% of water. A predetermined amount of the pulp slurry was filled in an aluminum mold assembly for producing a cushion for a cassette tape recorder with a radio set (CFD-33 manufactured by Sony Corp.). After the pulp slurry was pressed to remove about 30% of water therefrom, it was dried at 100° C. in an air blower drier while being held in the mold assembly. It took about 5 hours to dry the pulp slurry into a molded mass until the molded mass developed a mechanical strength (water content<about 15%) large enough to allow itself to be removed in one piece from the mold assembly. Even when a vacuum pulp was also used in combination with the air blower drier to dry the pulp slurry, it required about 2 hours to dry the pulp slurry.

In the first embodiment, as described above, the moldable pulp material according to the present invention is mainly composed of pulp made from waste paper such as waste newspaper and contains a binder of modified starch and thermally expandable hollow particles. Since the modified starch can be gelatinized at a relatively low temperature, a molded mass of the moldable pulp material filled in the mold assembly can be heated to shape at a relatively low temperature, and a period of time required before the heated molded mass can be removed from the mold assembly can be shortened. The resiliency which is imparted to the molded mass by the thermally expanded hollow particles is not impaired. The molded mass can be produced in a cycle time equivalent to the cycle time needed to produce foamed styrol, and exhibits a shock absorbing capability equivalent to the shock absorbing capability of foamed styrol. The moldable pulp material can be used to produce environmentally oriented shock absorbing packages as a substitute for foamed styrol packages, and hence can find useful industrial applications in view of the effective utilization of waste paper and the conservation of natural resources.

A heating apparatus according to a second embodiment of the present invention, for forming a molded pulp product, i.e., a shock absorbing material, of the moldable pulp material described above, will be described below with reference to FIGS. 11 through 13. According to the second embodiment, the heating apparatus heats the molded mass of the moldable pulp material with hot air. The molded mass of the moldable pulp material which is to be heated with hot air by the heating apparatus according to the second embodiment is produced by the mold assembly 11 shown in FIG. 2 and the pressing apparatus 21 shown in FIGS. 3 and 4.

The pulp mold material to be heated with hot air by the heating apparatus according to the second embodiment contains more water than the pulp mold material to be heated with steam by the heating apparatus according to the first embodiment. Specifically, the pulp mold material to be heated with hot air by the heating apparatus according to the second embodiment contains 80 weight %, for example, of water with respect to the mass of defibrated pulp. In the second embodiment, the pulp mold material may contain 30 to 80 weight % of water. The lower limit of the range for the water content, i.e., 20 weight %, represents an amount required to knead the mixture of the small pieces of paper and the fibrous component easily with the hollow particles and the modified starch, and to allow the modified starch to be gelatinized with heat from hot air. The upper limit of the range for the water content, i.e., 80 weight %, is determined by the period of time for which the molded mass is dried and the ease with which the molded mass is separated from the mold assembly. In the second embodiments, the upper and lower limits of the range for the water content have taken into account an amount of water which will be lost when heated with hot air.

Figure 11:
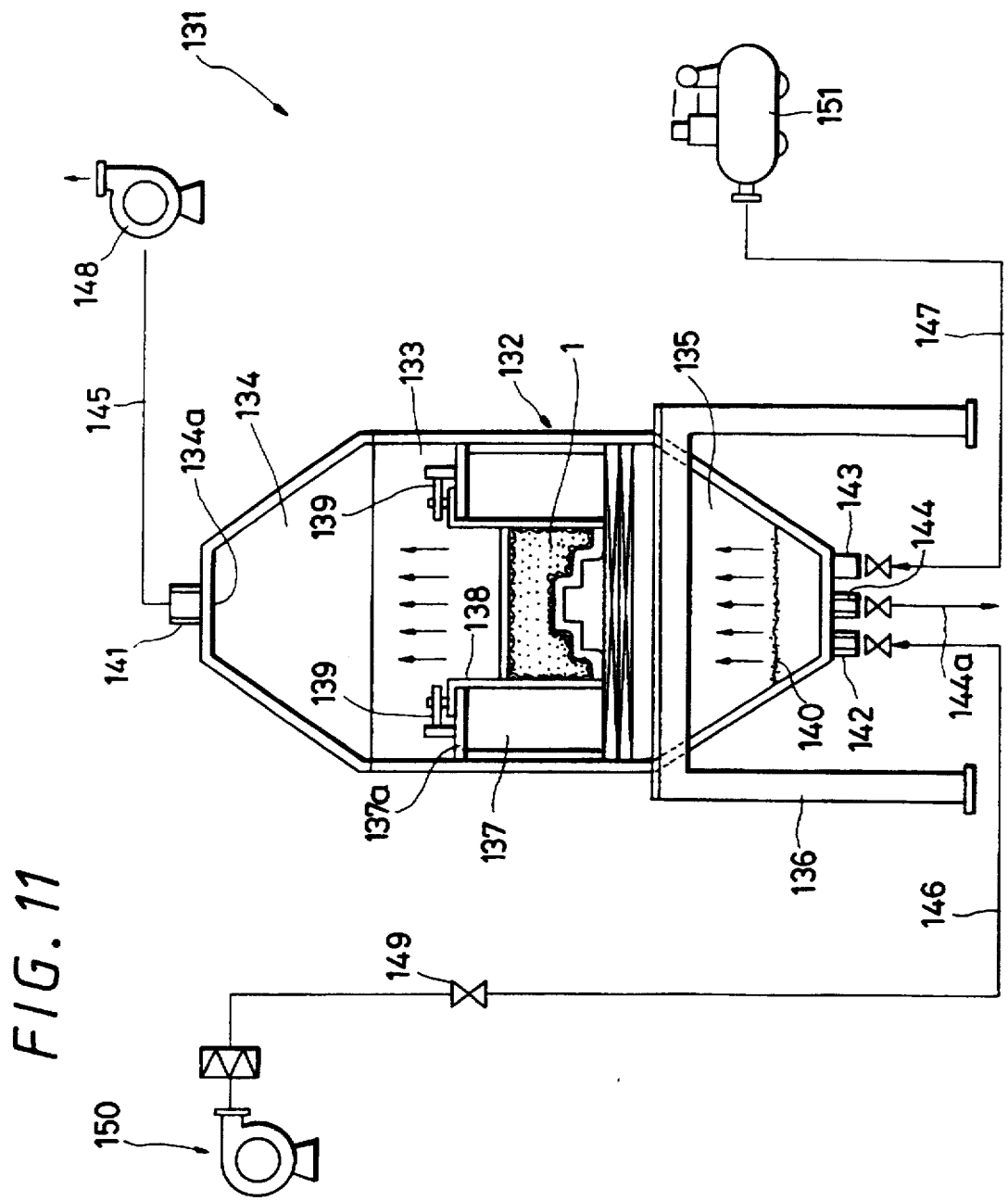
FIG. 11 is a diagram of a heating apparatus according to a second embodiment of the present invention.
Figure 12:
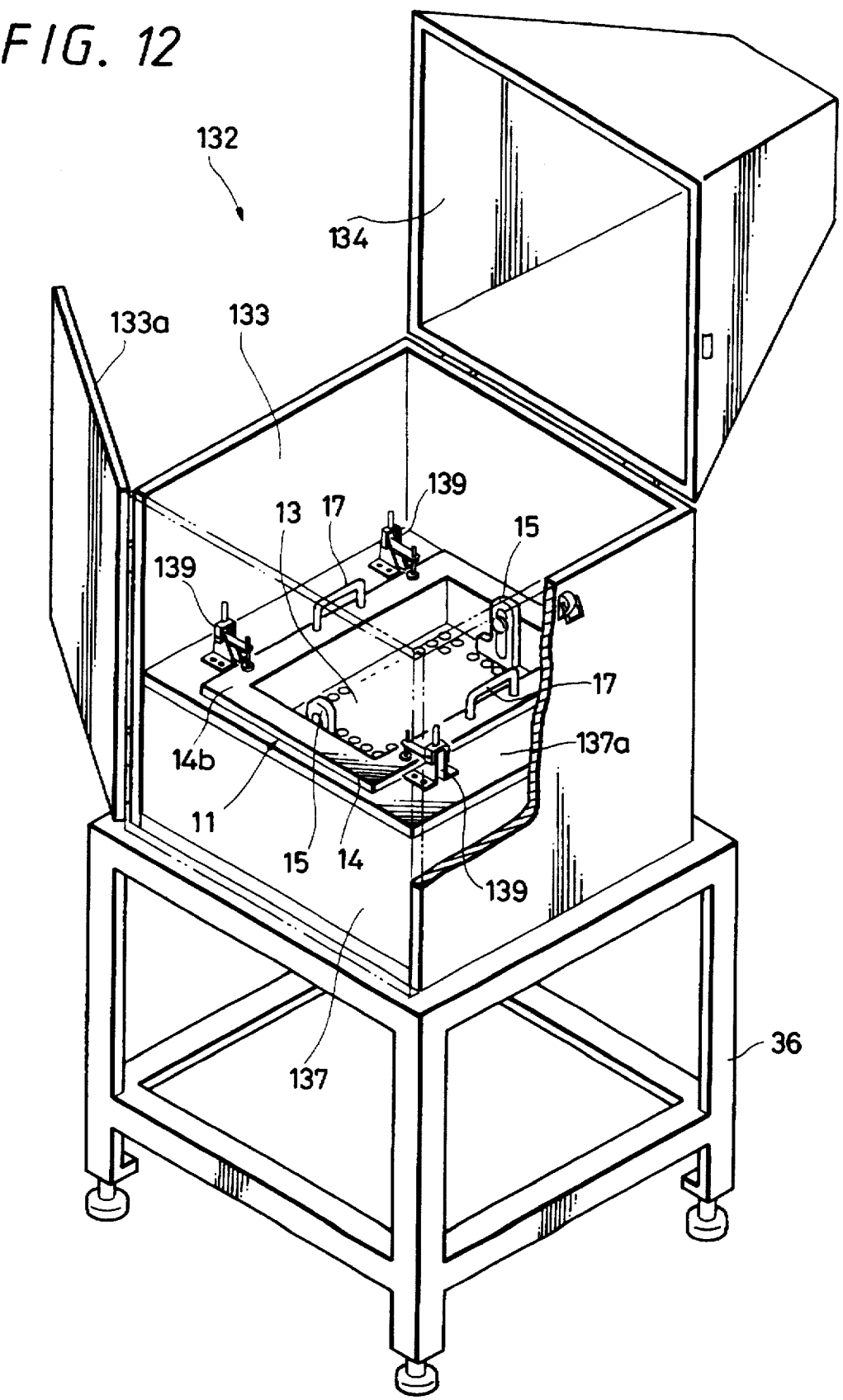
FIG. 12 is a perspective view of a main housing of the heating apparatus shown in FIG. 11.
Figure 13:
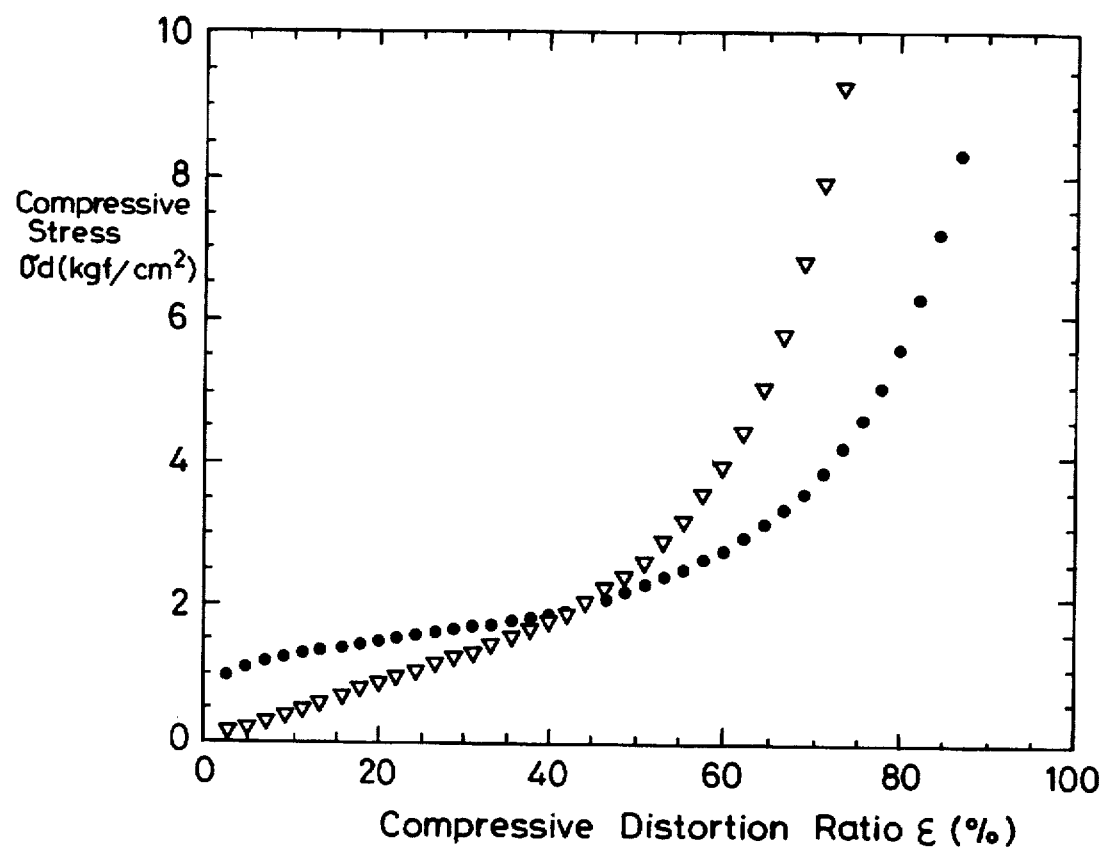
FIG. 13 is a graph showing the relationship between the compressive distortion ratio and the compressive stress plotted based on the results of a dynamic pressure test conducted on molded masses of moldable pulp materials.

As shown in FIGS. 11 and 12, a heating apparatus 131 according to the second embodiment comprises a main housing 132 having a mold assembly storage chamber 133 defined therein, an upper discharge chamber 134 defined above the main housing 132, and a lower pressure regulating chamber 135 (see FIG. 11) defined below the main housing 132. The main housing 132 is supported on a machine frame 136.

As shown in FIG. 12, the main housing 132 has a hinged front wall 133a which can be opened and closed to open and close the mold assembly storage chamber 133. The discharge chamber 133 has a frustopyramidal shape, and is hinged so as to be opened about a rear edge thereof with respect to the mold assembly storage chamber 133.

The mold assembly storage chamber 133 includes a lower space 137 defined below a mold assembly attachment plate 137a for receiving the mold assembly 11 therein, the lower space 137 communicating with the lower pressure regulating chamber 135. The mold assembly attachment plate 137a has a central opening 138 defined therein for receiving therein the frame 14 of the mold assembly 11 when the mold assembly 11 is placed in the lower space 137. When the mold assembly 11 is placed in the lower space 137 with the frame 14 received in the opening 138, the flange 14b is fastened to the mold assembly attachment plate 137a by a plurality of toggle clamps 139 which are mounted on the mold assembly attachment plate 137a around the opening 138.

As shown in FIG. 11, the lower pressure regulating chamber 135 has an inverted frustopyramidal shape, and houses a water droplet stop net 140 kept taut horizontally.

The main housing 132 of the heating apparatus 131 is associated with a piping system as described below.

The discharge chamber 134 has an upper wall 134a fitted with an outlet port 141. The pressure regulating chamber 135 has a lower wall 135a fitted with first and second inlet ports 142, 143 combined with respective valves and a water outlet port 144 combined with a valve. The piping system includes a discharging pipe 145 connected to the outlet port 141, a first pipe 146 connected to the first inlet port 142 for supplying hot air, a second pipe 147 connected to the second inlet port 143 for supplying air under pressure at normal temperature, and a drain pipe 144a connected to the water outlet port 144.

The discharging pipe 145 is connected to a discharge blower 148. The first pipe 146 is connected through a shutoff valve 149 to a hot air blower 150. The second pipe 147 is coupled to a compressor 151. The drain pipe 144a is connected to a drain.

A process of molding a shock absorbing material of the moldable pulp material using the mold assembly 11, the pressing apparatus 21, and the heating apparatus 131 will be described below.

First, the lower mold 12 is fitted into the lower open end of the frame 14, and an air- and water-permeable sheet 18 such as of nonwoven cloth is laid on the upper surface of the lower mold 12 and inner wall surfaces of the frame 14. Then, a predetermined amount of the moldable pulp material 1 is charged into the frame 14 and forcibly filled so as to fully cover the three-dimensional upper surface of the lower mold 12.

After the moldable pulp material 1 is charged, the sheet 18 is also placed over the upper surface of the moldable pulp material 1, and then the upper mold 13 is inserted into the frame 14 through its upper open end and placed on the moldable pulp material 1 with the sheet 18 interposed therebetween, as shown in FIG. 4. Thereafter, the screws 16 are inserted through the guide slots 15a in the attachment guide bars 15 and threaded into the end walls of the frame 14. At this time, the screws 16 are not fully tightened so that the upper mold 13 can slide vertically with respect to the frame 14.

As with the first embodiment, the air- and water-permeable sheet 18 such as of nonwoven cloth is laid on the upper surface of the lower mold 12, the inner wall surfaces of the frame 14, and the lower surface of the upper mold 13. However, the air- and water-permeable sheet 18 may be dispensed with if the vent holes 12a, 13a, 14a defined in the lower and upper molds 12, 13 and the frame 14 are sufficiently small in diameter or a lubricating layer is disposed on the upper surface of the lower mold 12, the inner wall surfaces of the frame 14, and the lower surface of the upper mold 13.

The mold assembly 11 which has thus been filled with the moldable pulp material 1 is then placed in the mold assembly holder 24 of the pressing apparatus 21, and set in position in the pressing apparatus 21 by the mold assembly clamps 26 which sandwich the mold assembly 11 in engagement with lower opposite sides of the mold assembly 11.

Thereafter, the air cylinder 23 is actuated to lower the cylinder rod 23a, pressing the presser disk 25 downwardly into the frame 14 against the upper surface of the upper mold 13. The air cylinder 23 is continuously operated to cause the presser disk 25 to press the upper mold 13 for thereby compressing the moldable pulp material 1 in the mold assembly 11 under a predetermined pressure. The moldable pulp material 1 is now adjusted in density such that its density will be about 0.125 g/cm$^3$ (=125 Kg/m$^3$) after it is dried, and has its lower portion shaped complementarily to the three-dimensional shape of the upper surface of the lower mold 12. When the moldable pulp material 1 is thus compressed, air trapped in the moldable pulp material 1 is removed, and the bonding force of the moldable pulp material 1 is increased.

Then, the screws 16 are fully tightened to fasten the upper mold 13 to the frame 14 through the attachment guide bars 15.

Thereafter, the cylinder rod 23a is lifted back, and the mold assembly 11 is removed from the mold assembly holder 24 and transferred into the heating apparatus 131. The molded mass of the moldable pulp material 1 in the mold assembly 11 is dried with heat into a shock absorbing material by the heating apparatus 131.

Operation of the heating apparatus 131 will be described below. The mold assembly 11 taken out of the pressing apparatus 21 is placed in the mold assembly storage chamber 133 of the heating apparatus 131. Specifically, the front wall 133a is opened, and the upper discharge chamber 134 is lifted open, exposing the mold assembly attachment plate 137a. The mold assembly 11 is fitted in the central opening 138 defined in the mold assembly attachment plate 137a, with the flange 14b placed on the mold assembly attachment plate 137a. The flange 14b is then fastened to the mold assembly attachment plate 137a by the toggle clamps 139. After the mold assembly 11 is fixedly positioned in the heating apparatus 131, the front wall 133a and the upper discharge chamber 134 are closed, sealing the mold assembly storage chamber 133.

Now, the shutoff valve 149 is opened, and the hot air blower 150 is operated to generate hot air. At this time, the valve of the water outlet port 144 is closed. The generated hot air, which is set to a temperature ranging from 100° C. to 110° C., as converted to heat, under a 1~1.5 atmospheric pressure, is delivered through the first pipe 146, and introduced from the first inlet port 142, opened by its valve, into the pressure regulating chamber 135. In the pressure regulating chamber 135, the hot air is uniformized in pressure. Then, the hot air is supplied to the lower space 137 in the mold assembly storage chamber 133. The hot air is supplied from the lower space 137 to the molded mass of the moldable pulp material 1 in the mold assembly 11. The supplied hot air flows into the mold assembly 11 through the vent holes 12a, 14a of the lower mold 12 and the frame 14, passes through and heats the molded mass of the moldable pulp material 1 in the mold assembly 11, and flows from the vent holes 13a of the upper mold 13 into the upper discharge chamber 134 above the mold assembly storage chamber 133. Thereafter, the hot air which now contains steam is forcibly drawn and discharged from the upper discharge chamber 134 through the outlet port 141 and the discharging pipe 145 by the discharge blower 148.

The hot air supplied to and passing through the molded mass of the moldable pulp material 1 is forcibly drawn and discharged under a negative pressure, e.g., a 0.5 atmospheric pressure, by the discharge blower 148, while heating the molded mass.

The hot air is supplied and forcibly discharged continuously for a given period of time, e.g., of several tens seconds. Then, while the discharge blower 148 is in operation, the first inlet port 142 is closed by its valve, and the second inlet port 143 is opened by its valve. A gas having a temperature lower than the temperature at which the modified starch is gelatinized, e.g., dry air at normal temperature under a predetermined pressure, e.g., a 1.4 atmospheric pressure, is supplied from the compressor 151 through the second pipe 147 to the pressure regulating chamber 135 continuously for a time period from about ten seconds to about one or two minutes.

After the dry air is supplied and forcibly discharged, the mold assembly storage chamber 133 is opened as described above and the mold assembly 11 is removed from the heating apparatus 131. Immediately thereafter, the molded mass of the moldable pulp material 1 is removed from the mold assembly 11.

As described above, the molded mass of the moldable pulp material 1 is heated with the hot air while in the main housing 132 of the heating apparatus 131, during which time the modified starch added as a binder to the moldable pulp material 1 is gelatinized. When water is evaporated from the gelatinized modified starch, the bonding strength of the gelatinized modified starch becomes strong enough to allow the molded mass to be removed in one piece from the mold assembly 11.

Specific experimental examples in which a moldable pulp material was molded into a shock absorbing material by the above steam-heating process according to the second embodiment will be described below.

EXPERIMENTAL EXAMPLE 3

A moldable pulp material which was prepared from the above constituents at the above proportions was filled in the mold assembly, and adjusted to a specific gravity of 0.125. The mold assembly was installed in the heating apparatus, and heated with hot air at 100° C. to 110° C. under a 1~1.4 atmospheric pressure, supplied from below the mold assembly. The hot air passed through the molded mass of the moldable pulp material in about 1 minute after the hot air started to be supplied to the heating apparatus, and then the hot air which contained steam was discharged from the outlet port. After the hot air was further supplied for 30 seconds, the valve of the first inlet port was closed, and the mold assembly was removed from the heating apparatus. While the molded mass was being heated with the hot air for 1 minute and 30 seconds, the modified starch added as a binder was gelatinized. After the molded mass was heated with the hot air, the gelatinization of the modified starch progressed due to the heat which had been imparted by the hot air, and water was evaporated from the gelatinized modified starch, for about 1 minute while the molded mass was being retained in the mold assembly prior to removal therefrom. It was therefore confirmed that the molded mass developed enough bonding forces to remove itself from the mold assembly. The forced discharge of the hot air is effective to shorten the period of time required to dry the molded mass. In this experimental example, when the molded mass was heated with the hot air for less than 20 seconds, the entire molded mass was not sufficiently gelatinized, and the mechanical strength of the dried product was insufficient. The period of time for which the molded mass is to be heated with the hot air depends on the thickness of the molded mass and the structure of the mold assembly, and the modified starch starts being gelatinized when supplied with water and heated to a temperature higher than the gelatinization temperature thereof. It is necessary in the experimental example 3 to heat the molded mass with the hot air for at least about 20 seconds after the entire molded mass is filled with the steam and hold the molded mass in the mold assembly for about 30 seconds, if no forced discharge of hot air is employed. The molded mass removed from the mold assembly was then heated at 60° C. for 4 hours by an air blower drier, so that it was dried enough to be practically usable as a shock absorbing material.

EXPERIMENTAL EXAMPLE 4

The mold assembly filled with the above moldable pulp material which was adjusted in density was installed in the heating apparatus, and heated with hot air at 100° C. to 110°

C. supplied from below the mold assembly and forcibly discharged under a negative pressure of about a 0.5 atmospheric pressure from above the mold assembly. The hot air passed through the molded mass of the moldable pulp material in about 20 seconds after the steam started to be supplied to the heating apparatus, and the hot air which contained steam was discharged from the discharge blower connected to the outlet port of the heating apparatus. Thereafter, the hot air was supplied and forcibly discharged for 20 seconds. Then, while the discharge blower was in operation, dry cold air was supplied under about a 1.4 atmospheric pressure to the molded mass for 30 seconds. Immediately after the mold assembly was taken from the heating apparatus, the molded mass could be removed from the mold assembly. The bonding strength of the modified starch contained in the molded mass removed from the mold assembly proved large enough to allow the mass removed in one piece from the mold assembly as with the experimental example 3. Since the amount of water contained in the heated molded mass was smaller than with the experimental example 3, it was found that the period of time required for the hot air to enter the molded mass in its entirety was reduced to about half (from about 1 minute to about 20 seconds) and the period of time for which the molded mass was heated with the hot air was reduced to about half (from 30 seconds to 20 seconds) by forcibly drawing and discharging the hot air. After the molded mass was heated with the hot air, the dry cold air which was supplied and forcibly discharged promoted evaporation of water from the molded mass, resulting in a reduction of the time (from 1 minute to 30 seconds) required before removing the molded mass from the mold assembly. Inasmuch as the dry cold air which was supplied to the molded mass was effective to cool the molded mass, the molded mass removed from the mold assembly was easily handled. It was confirmed that, in both the experimental examples 3, 4, it was possible to form a shock absorbing pulp molding in a molding cycle time ranging from about 1 minute and 10 seconds to 2 minutes and 30 seconds, which was less than the molding cycle time of about 3 minutes for molding foamed styrol.

Evaluation of shock absorbing capability

The molded masses or blocks produced in the experimental examples 3 and 4 were tested in a dynamic compression test, and a stress vs. distortion diagram was plotted based on the results of the dynamic compression test for the evaluation of a shock absorbing capability. There was no difference between shock absorbing capabilities of the molded masses produced in the experimental examples 3 and 4, and the compressive stress at a compressive distortion of 50% of the molded masses produced in the experimental examples 3 and 4 had a value equivalent to the value of foamed styrol expanded 40 times in size. It was confirmed that it was possible to form a molded mass having the same shock absorbing capability, i.e., the shock absorbing coefficient: Cf=compressive stress/distorting energy, as that of foamed styrol. FIG. 13 shows the relationship between the compressive distortion ratio and the compressive stress based on the results of the dynamic compression test conducted on the experimental examples 3 and 4 (dry type including 3% of thermally expandable hollow particles) and foamed styrol expanded 40 times in size.

In the experimental examples 3 and 4 described above, the defibrated pulp, the thermally expandable hollow particles, and the modified starch as a binder are uniformly mixed with an amount of water small enough to keep the materials unseparated, e.g., 30 to 80 weight %, preferably, 30 to 50 weight % of water. The mixture is then filled in the mold assembly, and hot air is supplied to one side of the mold assembly and passed through the mold assembly at a temperature higher than the gelatinization of the modified starch. When the molded mass in the mold assembly is heated with the hot air, the modified starch is gelatinized, and water is evaporated from the gelatinized modified starch with the heat of the applied hot air. As a result, the molded mass develops sufficient bonding forces. At the same time that the hot air is applied to heat the molded mass, the hot air is forcibly drawn and discharged from the opposite side of the molded mass. Thus, the period of time in which the entire molded mass in the mold assembly is heated up to a temperature higher than the gelatinization temperature of the modified starch is shortened, making it possible to reduce the period of time spent after the heating of the molded mass in the molded assembly to the removal of the molded mass from the mold assembly. After the gelatinization of the modified starch heated by the hot air is completed, the supply of the hot air is cut off, and dry cold air or nitrogen at a temperature lower than the gelatinization temperature of the modified starch is applied to one side of the molded mass to cool the molded mass. This is also effective to shorten the period of time spent after the heating of the molded mass in the molded assembly to the removal of the molded mass from the mold assembly. In this case, the dry cold air is forcibly discharged from the opposite side of the molded mass to promote the evaporation of water from the molded mass for thereby accelerating the solidification of the modified starch and increasing the bonding force of the molded mass. Consequently, the period of time spent after the heating of the molded mass in the molded assembly to the removal of the molded mass from the mold assembly can further be reduced. The molded mass thus heated and cooled is removed from the mold assembly, and then dried by an air blower drier until the water content of the molded mass reaches about 15 weight %.

In the second embodiment, as described above, the moldable pulp material according to the present invention is mainly composed of pulp made from waste paper such as waste newspaper and contains a binder of modified starch and thermally expandable hollow particles. The moldable pulp material is pressed into a molded mass and heated with hot air, producing a shock absorbing pulp molding having an excellent shock absorbing capability in a short period of time. The molded mass can be produced in a cycle time equivalent to the cycle time needed to produce foamed styrol, and exhibits a shock absorbing capability equivalent to the shock absorbing capability of foamed styrol. The moldable pulp material can be used to produce environmentally oriented shock absorbing packages as a substitute for foamed styrol packages, and hence can find useful industrial applications in view of the effective utilization of waste paper and the conservation of natural resources.

In the above embodiments, the moldable pulp material is primarily composed of a mass of defibrated pulp produced from waste paper. As described above, the mass of defibrated pulp comprises a mixture of small pieces of paper and a fibrous component. The ratio between the small pieces of paper and the fibrous component depends on the period of time during which the waste paper is to be defibrated by the defibrator. If the waster paper is defibrated for too a long period of time, then the moldable pulp material will be too costly to manufacture, and the waste paper will be defibrated almost entirely or fully into a fibrous component, which cannot absorb a sufficient amount of water. The ratio between the small pieces of paper and the fibrous component should, therefore, be determined in view of the cost and the each with which the defibrated pulp can absorb water.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A method of manufacturing a molded pulp product, comprising the steps of:

mixing a moldable pulp material comprising a main constituent of pulp, a starch binder, and thermally expandable hollow microspheres with water in an amount which is effective to gel the starch binder upon heating;

filling the moldable pulp material mixed with the water in a mold assembly and compressing the moldable pulp material in the mold assembly; and heating the compressed moldable pulp material to at least a gelation temperature at which the starch binder is gelled and the microspheres are expanded, for thereby gelling the starch binder and expanding the microspheres to produce a molded pulp product of the moldable pulp material cooling the molded pulp product with air, removing the molded pulp product from the mold assembly, wherein the heating cooling and removing steps are carried out in a molding cycle time of less than or about 2½ minutes.

2. A method according to claim 1, wherein said compressed moldable pulp material is heated with steam.

3. A method according to claim 2, wherein said compressed moldable pulp material is heated with the steam for at least 20 seconds under a 1 to 1.5 atmospheric pressure.

4. A method according to claim 2, further comprising the step of drawing and forcibly discharging the steam through said compressed moldable pulp material.

5. A method according to claim 2, further comprising the step of supplying a gas at a temperature lower than said gelation temperature to said compressed moldable pulp material after the compressed moldable pulp material is heated with said steam.

6. A method according to claim 2, wherein said moldable pulp material contains water in an amount ranging from 20 to 60 weight %.

7. A method according to claim 6, wherein said pulp comprises piece of paper having a size of about 2 millimeters by about 2 millimeters and a fibrous component defibrated from waste paper, said fibrous component having a proportion greater than said pieces of paper.

8. A method according to claim 2, wherein said thermally expandable hollow particles comprise particles each having an outer shell of polymer and a core comprising hydrocarbon which is covered with said outer shell, and wherein said particle are heated, the outer shell of polymer is softened, and the core comprising hydrocarbon is gasified, expanding the particles.

9. A method according to claim 8, wherein said thermally expandable hollow particles are added in an amount ranging from 1 to 5 weight %.

10. A method according to claim 1, wherein said compressed moldable pulp material is heated with hot air.

11. A method according to claim 10, wherein said compressed moldable pulp material is heated with the hot air at 100° C. to 110° C. for at least 20 seconds.

12. A method according to claim 10, further comprising the step of drawing and forcibly discharging the hot air through said compressed moldable pulp material.

13. A method according to claim 10, wherein said moldable pulp material contains water in an amount ranging from 30 to 80 weight %.

14. A method according to claim 13, wherein said pulp comprises pieces of paper having a size of about 2 millimeters by about 2 millimeters and a fibrous component defibrated from waste piper, said fibrous component having a proportion greater than said pieces of paper.

15. A method according to claim 10, wherein said thermally expandable hollow particles comprise particles each having an outer shell of polymer and a core comprising hydrocarbon which is covered with said outer shell, and wherein when said particles are heated, the outer shell of polymer is softened, and the core comprising hydrocarbon is gasified, expanding the particles.

16. A method according to claim 15, wherein said thermally expandable hollow particles are added in an amount ranging from 1 to 5 weight %.

17. A molded pulp product comprising a main constituent of pulp, a starch binder that can be gelled with water upon the application of heat, and thermally expandable hollow microspheres, the moldable pulp material being moldable into a molded pulp product by heating the molded pulp product in a mold and cooling the molded pulp product with air followed by removing the molded pulp product from the mold, the heating, cooling and removing steps being performed in a molding cycle time of less than or about 2½ minutes.

18. A moldable pulp material according to claim 17, wherein said thermally expandable hollow particles comprise particles each having an outer shell of polymer and a core comprising hydrocarbon which is covered with said outer shell, and wherein when said particles are heated, the outer shell of polymer is softened, and the core comprising hydrocarbon is gasified, expanding the particles.

19. A moldable pulp material according to claim 18, wherein said thermally expandable hollow particles are added in an amount ranging from 1 to 5 weight %.

20. A moldable pulp material according to claim 17, wherein said starch binder comprises acetylized or esterified modified starch having a modified portion of the hydroxyl group in molecules of starch.

21. A moldable pulp material according to claim 17, further comprising water in an amount ranging from 20 to 80 weight %.

22. A moldable pulp material according to claim 17, wherein said pulp comprises pieces of paper having a size of about 2 millimeters by about 2 millimeters and a fibrous component defibrated from waste paper, said fibrous component having a proportion greater than said pieces of paper.

23. A shock absorbing material manufactured by mixing a moldable pulp material comprising a main constituent of pulp, a starch binder, and thermally expandable hollow microspheres and water in an amount which is effective to gel the starch binder, filling the moldable pulp material mixed with the water in a mold assembly and compressing the moldable pulp material in the mold assembly, heating the compressed moldable pulp material for thereby gelling the starch binder and expanding the microspheres, cooling the molded pulp product with air, removing the molded pulp product from the mold assembly, wherein the heating, cooling and removing steps are carried out in a molding cycle time of less than or about 2½ minutes.

24. A shock absorbing material according to claim 23, wherein said thermally expandable hollow microspheres are added in an amount ranging from 1 to 5 weight %.

25. A shock absorbing material according to claim 23, wherein said starch binder comprises acetylized or esterified modified starch in which a portion of the hydroxyl group in molecules of starch is modified.

26. A shock absorbing material according to claim 23, wherein said starch binder is added in an amount of substantially 10 weight %.

* * * * *